May 7, 1968 G. E. APPLE 3,381,726
TREE BORING APPARATUS
Filed April 20, 1966 3 Sheets-Sheet 1

INVENTOR.
GAROLD E. APPLE
BY M. A. Hobbs
ATTORNEY

May 7, 1968 G. E. APPLE 3,381,726
TREE BORING APPARATUS
Filed April 20, 1966 3 Sheets-Sheet 2

INVENTOR.
GAROLD E. APPLE
BY m.a. Hobbs
ATTORNEY

INVENTOR.
GAROLD E. APPLE
BY M. A. Hobbs
ATTORNEY

United States Patent Office 3,381,726
Patented May 7, 1968

3,381,726
TREE BORING APPARATUS
Garold E. Apple, R.R. 4, Plymouth, Ind. 46563
Filed Apr. 20, 1966, Ser. No. 544,033
7 Claims. (Cl. 144—93)

The present invention relates to a tree boring apparatus and more particularly to an apparatus for boring a hole in the bottom of a Christmas tree for receiving a stud, shaft or similar means for holding the tree erect in a stand or rack.

There are a number of stands and racks on the market which utilize a stud, shaft or screw for securing the trunk of a Christmas tree to a stand or rack. While some of the stands and racks use a screw or stud which is sufficiently pointed that it will make its own hole as it is screwed into the bottom of the tree, this means and method of securing the screw or stud has been found unsatisfactory, in that the stud tends to follow the path of least resistance and often fails to extend straight into the trunk or veers to the side and often becomes loose after the tree has been placed on the stand or rack. In the past, the type of screw or stud requiring a pre-drilled hole in the bottom of the trunk has not been entirely satisfactory, in that the trees have been difficult to drill straight and in the center, so that they would stand erect when placed on the stand or rack after the screw or stud had been inserted in the hole. It is therefore one of the principal objects of the present invention to provide a tree boring apparatus which will accurately drill a hole in the bottom of a tree trunk in axial alignment therewith and which can readily be adjusted to operate on various sized trees and to drill various sized holes of the desired depth.

Another object of the invention is to provide an apparatus for drilling a hole in the bottom of a Christmas tree or the like which is so constructed and arranged that the drilled hole is parallel with the overall axis of the tree trunk, rather than with the axis of the trunk at or near the bottom, and which permits the drill to be easily centered in the bottom of the trunk and guided into the tree.

Still another object of the invention is to provide a tree boring apparatus which is so constructed and arranged that the operator can use both hands to insert and hold the tree for boring, and which requires little experience or skill in order to bore the trees accurately with respect to the overall axis of the tree.

Another object of the invention is to provide a tree positioning device for tree boring mechanisms which positions the tree trunk in generally vertical position so that the bored tree stands erect on its stand regardless of crooks or other irregularities in the trunk at various places in its height, and which can be adjusted to accommodate various sized trees.

A further object is to provide a relatively simple and compact tree boring apparatus which is safe and clean to use, and which can easily be installed and operated, either in or out of doors, and moved or transported from place to place without disassembling.

Additional objects and advantages of the invention will become apparent from the following description and accompanying drawings, wherein.

Figure 1:
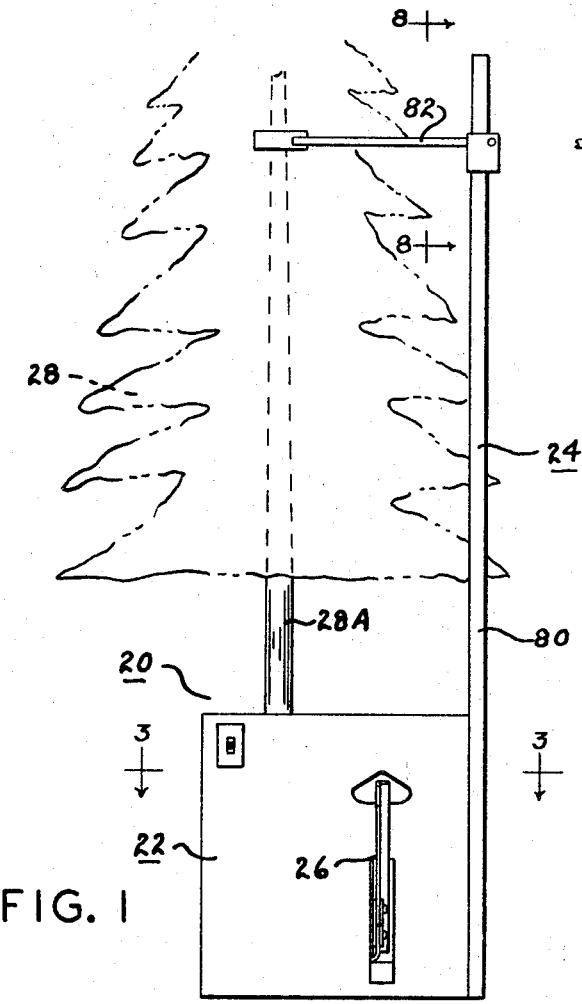
FIGURE 1 is an elevational view of the present tree boring apparatus.
Figure 8:
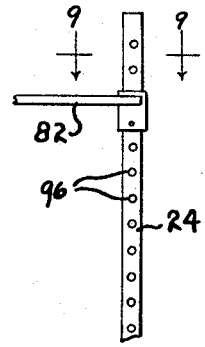
FIGURE 8 is a fragmentary elevational view of a portion of the tree positioning device embodied in the apparatus.

Referring more specifically to the drawings and to FIGURE 1 in particular, numeral 20 designates generally the present tree boring apparatus, 22 a base having a housing 23 enclosing the boring and operating mechanisms, 24 a tree positioning device mounted on and secured to housing 23, and 26 the manual operating and control mechanism used by the operator when the tree is being bored. A Christmas tree 28 is shown in phantom or outline for the purpose of illustrating the manner in which the present apparatus is operated to bore a tree so that it will stand erect in a Christmas tree stand or rack. The present apparatus is designed to handle various sized trees and to be portable, and is so constructed that it can be used effectively either indoors or outdoors in various kinds of weather conditions. Further, it may be varied in size, depending upon the anticipated type and size of trees to be bored. While it is designed primarily for Christmas trees, it may be used for boring other types of trees or branches, both natural and artificial, for decorative and other purposes.

Figure 4:
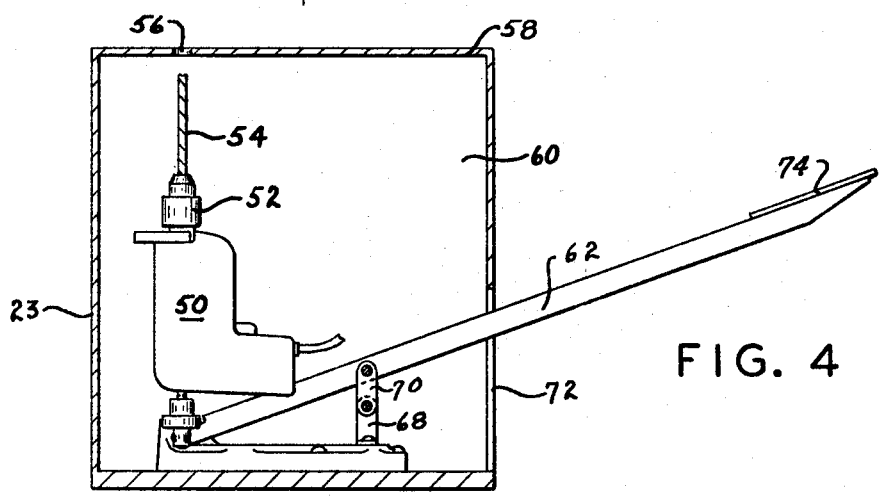
FIGURE 4 is a vertical cross sectional view taken on line 4—4 of FIGURE 2, showing the apparatus in its non-operating position.
Figure 5:
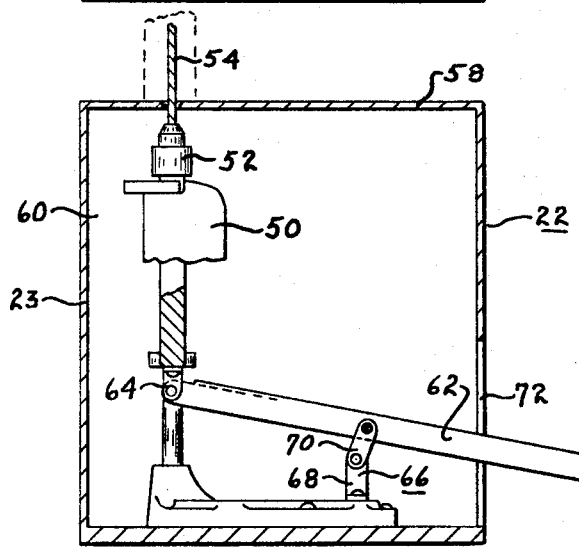
FIGURE 5 is a vertical cross sectional view taken on line 5—5 of FIGURE 2, showing the apparatus in its operating position.
Figure 6:
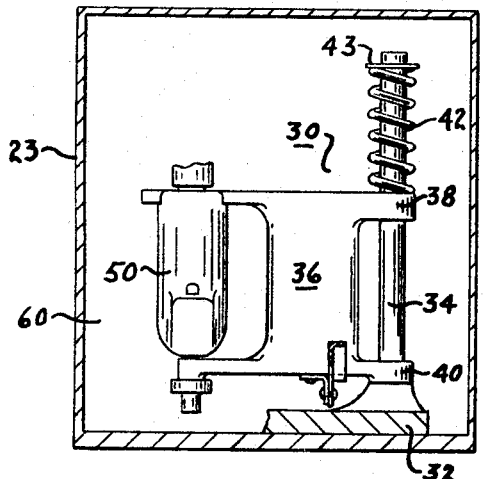
FIGURE 6 is a vertical cross sectional view taken on line 6—6 of FIGURE 3.
Figure 7:
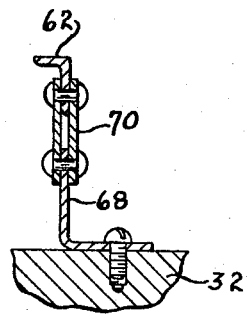
FIGURE 7 is an enlarged fragmentary cross sectional view of an operating member, the section being taken on line 7—7 of FIGURE 3.

The tree boring mechanism is enclosed in housing 23 and includes a stand 30 having a base 32 and an upright 34 of a shaft-like construction rigidly mounted at its lower end in base 32. A carriage 36 is mounted on upright 34 for reciprocation from its lower position, illustrated in FIGURE 4, to the elevated and tree boring position shown in FIGURE 5. The carriage is provided with two arms 38 and 40, having holes therein and forming bearings for sliding on the upright. A coil spring 42 on the upper end of the upright returns the carriage from its operating position to its non-operating position at the lower end of the carriage. The spring reacts between the upper end of the carriage and a collar 43 secured to the upper end of the upright. Various types of springs or other resilient means may be used to obtain satisfactory return of the carriage, for example, instead of using a compression spring, an extension spring secured to the carriage and anchored to base 32 or to the bottom of the housing, which is extended when the carriage is elevated, may be preferred in some installations.

An electric motor 50 is mounted rigidly on carriage 36 and is provided with a chuck 52 for holding a drill 54. The drill passes upwardly through a hole 56 in top 58 of the housing when the mechanism is operated and is completely withdrawn into compartment 60 when the mechanism is in inoperative position. The carriage is operated by lever 62 which is pivoted at its inner end on pivotal connection 64 at the bottom of the carriage and on bracket 66 mounted on the base and consisting of a lower member 68 and a pivoted member 70 pivotally connected to the lever in spaced relation to the pivotal connection 64. The level extends outwardly through a slot or opening 72 in the side of the housing and is provided with a pedal or pad 74 on the outer end.

Figure 11:
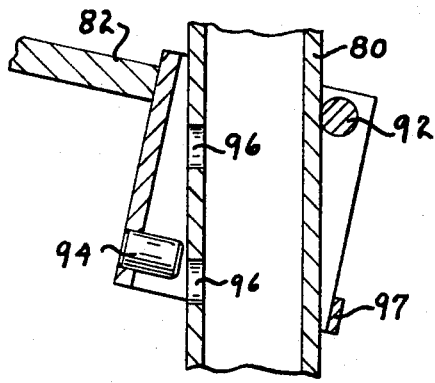
FIGURE 11 is a vertical cross sectional view similar to that shown in FIGURE 10, but showing the manner in which the device is adjusted to accommodate various sized trees.

The adjustable tree positioning device consists of a vertical post 80 and a horizontal arm 82 extending from the post to a position substantially directly over hole 56 and drill 54. The post is positioned a substantial distance away from the hole in order to prevent the post from interfering with mounting the tree on and removing it from the apparatus. Arm 82 is provided with two outwardly projecting fingers 84 and 86 forming a generally V-shaped configuration for receiving the tree trunk 28A in the manner illustrated in FIGURES 1 and 2. The arm is adjusted to various levels by adjustment means consisting of a substantially U-shaped bracket 90 extending around three sides of the square post 80 and having a pin 92 on the side thereof opposite arm 82 for holding the arm in horizontal position on the post after an adjustment has been made. The bracket is held in various vertically adjusted positions on the post by a pin 94 on the same side of the bracket as arm 82, the pin seating in one of a plurality of holes 96 positioned in spaced relation along the side of post 80. As can be seen in FIGURE 11, when the arm is tilted upwardly, pin 94 slips from the holes, thus permitting bracket 90 to be slipped longitudinally upwardly or downwardly on the post. When the arm has been moved to the desired position, it is tilted to the horizontal position, thus seating pin 94 in another hole, and locking the arm in its adjusted position. A lug or bar 97 is preferably placed along the bottom of bracket 90 opposite pin 94 to limit the movement of the bracket while an adjustment is being made, thereby eliminating the possibility of the bracket binding on the post while it is being moved. Different types of adjustment means for holding the arm at various levels may be used; however, the one illustrated can be easily adjusted to the desired position and the arm is held firmly in place while the boring operation is being performed.

Figure 2:
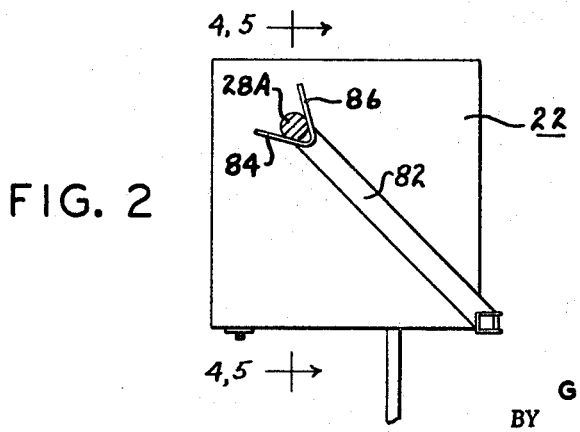
FIGURE 2 is a top plan view of the tree boring apparatus shown in FIGURE 1.
Figure 3:
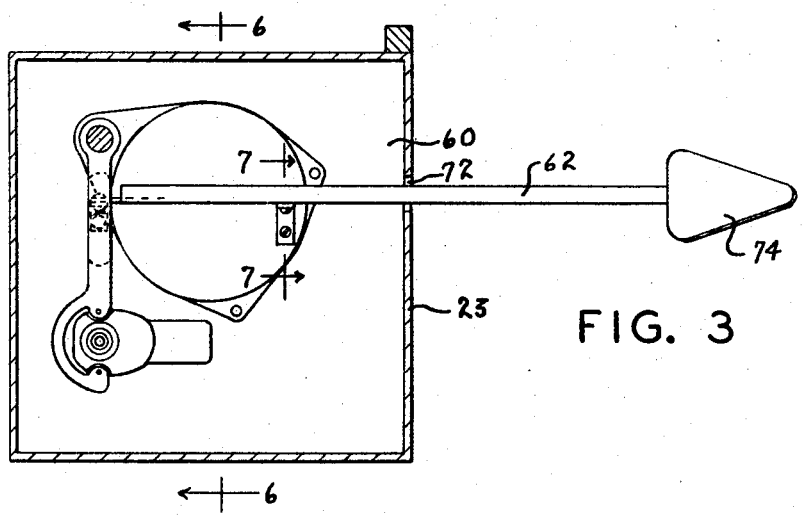
FIGURE 3 is a horizontal cross sectional view of the apparatus shown in the preceding figures, the section being taken on line 3—3 of FIGURE 1.
Figure 9:
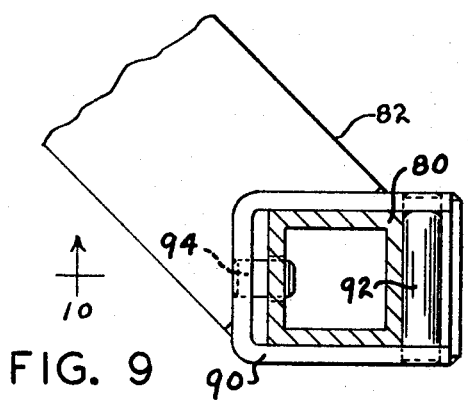
FIGURE 9 is an enlarged fragmentary cross sectional view of the tree positioning device, the section being taken on line 9—9 of FIGURE 8.
Figure 10:
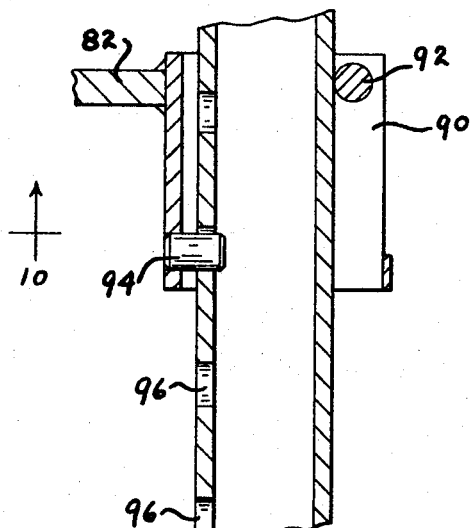
FIGURE 10 is a fragmentary vertical cross sectional view of the tree positioning device, the section being taken on line 10—10 of FIGURE 9.

In the operation of the present apparatus, a tree is seated on top 58 directly over hole 56, and the trunk in the section containing the limbs is seated in the holder formed by fingers 84 and 86 in the manner illustrated in FIGURES 1 and 2. With the motor operating, the operator presses pedal 74 downwardly, causing lever 62 to raise carriage 36, thereby lifting motor 50 and rotating drill 54, causing the drill to pass through hole 56 into the bottom of the tree trunk in the manner illustrated in FIGURE 5. The shavings or drillings from the tree fall through hole 56 into the housing. After the tree has been drilled the desired height, the operator merely removes his foot from the pedal, thereby permitting spring 42 to return the carriage to its lowered, inoperative position. An adjustment in arm 82 may be made as the tree is seated on housing 23 in order to accommodate the height of the tree and to place the trunk in the desired overall vertical position, the adjustment being made in the manner described hereinabove and illustrated effectively by FIGURES 9, 10 and 11. After a number of trees have been bored, the borings from the trees can be easily removed from the housing through a suitable door in the wall of the housing.

While only one embodiment of the present invention has been described in detail herein, various changes and modifications may be made without departing from the scope of the invention.

I claim:
1. A tree boring apparatus comprising a base, a means for holding a drill bit and for reciprocating the bit vertically, a motor for driving the bit, means adjacent the bit for positioning the lower end of the trunk of a tree over the bit, a tree positioning device connected to said base and extending upwardly therefrom, said device including a vertically positioned post parallel with said bit and spaced therefrom, an arm on said post extending laterally therefrom to a position substantially over said bit, means on said arm having an open side for engaging the trunk of a tree and retaining the trunk in an upright position, and means for adjusting said arm vertically on said post in spaced relation to the bit, said tree positioning device being secured to said base and spaced a substantial distance from the drill bit and the arm thereof extending generally horizontally from said post.

2. A tree boring apparatus as defined in claim 1, in which the base includes a housing having a top with a portion defining a hole through which the bit reciprocates.

3. A tree boring apparatus as defined in claim 2, in which said means for holding a drill bit and for reciprocating the bit vertically includes a carriage, an operating lever means for moving the carriage vertically in one direction, and a spring means for moving the carriage in the opposite direction.

4. A tree boring apparatus as defined in claim 3, in which the motor is mounted on the carriage and includes a chuck for holding the drill bit.

5. A tree boring apparatus as defined in claim 1, in which the means for adjusting the arm vertically on the post consists of a U-shaped bracket embracing the post, a series of spaced holes arranged vertically in said post, and a pin in said bracket for seating in said holes for obtaining a vertical adjustment of the arm.

6. A tree boring apparatus as defined in claim 1, in which the post of said tree positioning device is secured to said base and spaced a substantial distance from the drill bit and the arm thereof extends horizontally from said post and is provided with a V-shaped fixture at the free end thereof for engaging the trunk of a tree.

7. A tree boring apparatus as defined in claim 6, in which the means for adjusting the arm vertically on the post consists of a U-shaped bracket embracing the post, a series of spaced holes arranged vertically in said post, and a pin in said bracket for seating in said holes for obtaining a vertical adjustment of the arm.

References Cited

UNITED STATES PATENTS

| | | | |
|---|---|---|---|
| 3,191,266 | 6/1965 | Breneman | 144—93 |
| 3,245,441 | 4/1966 | Nichols | 144—93 |

FOREIGN PATENTS

| | | |
|---|---|---|
| 541,351 | 5/1957 | Canada. |

DONALD R. SCHRAN, *Primary Examiner.*